United States Patent [19]

Robertson et al.

[11] Patent Number: 4,467,884
[45] Date of Patent: Aug. 28, 1984

[54] STEERING STABILIZER

[76] Inventors: Gene V. Robertson, 1906 Esther, Carlisle, Pa. 17013; Robert G. Robertson, 4522 Sheffield, Corpus Christi, Tex. 78411

[21] Appl. No.: 397,475

[22] Filed: Jul. 12, 1982

[51] Int. Cl.³ .............................................. B62D 7/00
[52] U.S. Cl. ..................................................... 180/90
[58] Field of Search ...................... 280/90, 89, 94, 108; 74/495

[56] References Cited

U.S. PATENT DOCUMENTS

| | | | |
|---|---|---|---|
| 1,375,419 | 4/1921 | Schuler | 280/89 |
| 3,420,542 | 1/1969 | Jordan | 280/90 |
| 3,721,455 | 3/1973 | Blanton | 280/94 |
| 3,980,315 | 9/1974 | Hefren | 280/94 |
| 4,213,626 | 7/1980 | Moore | 280/94 |

FOREIGN PATENT DOCUMENTS 258563  5/1928  Italy ....................................... 280/89

Primary Examiner—John A. Pekar
Attorney, Agent, or Firm—Thomas Hooker

[57] ABSTRACT

An adjustable hydraulic steering stabilizer for a roadway vehicle including a stabilizing bar attached to each front wheel assembly, a friction strip for engaging each bar to resist undesired turning of the wheel assemblies, a hydraulic pump and hydraulic cylinders for biasing the strips against the stabilizing bars, thereby providing forces resisting turning of the wheel assemblies. The vehicle operator may adjust the hydraulic system to vary the pressure biasing the friction strips against the bars, thereby varying the damping force in accordance with driving conditions.

14 Claims, 6 Drawing Figures

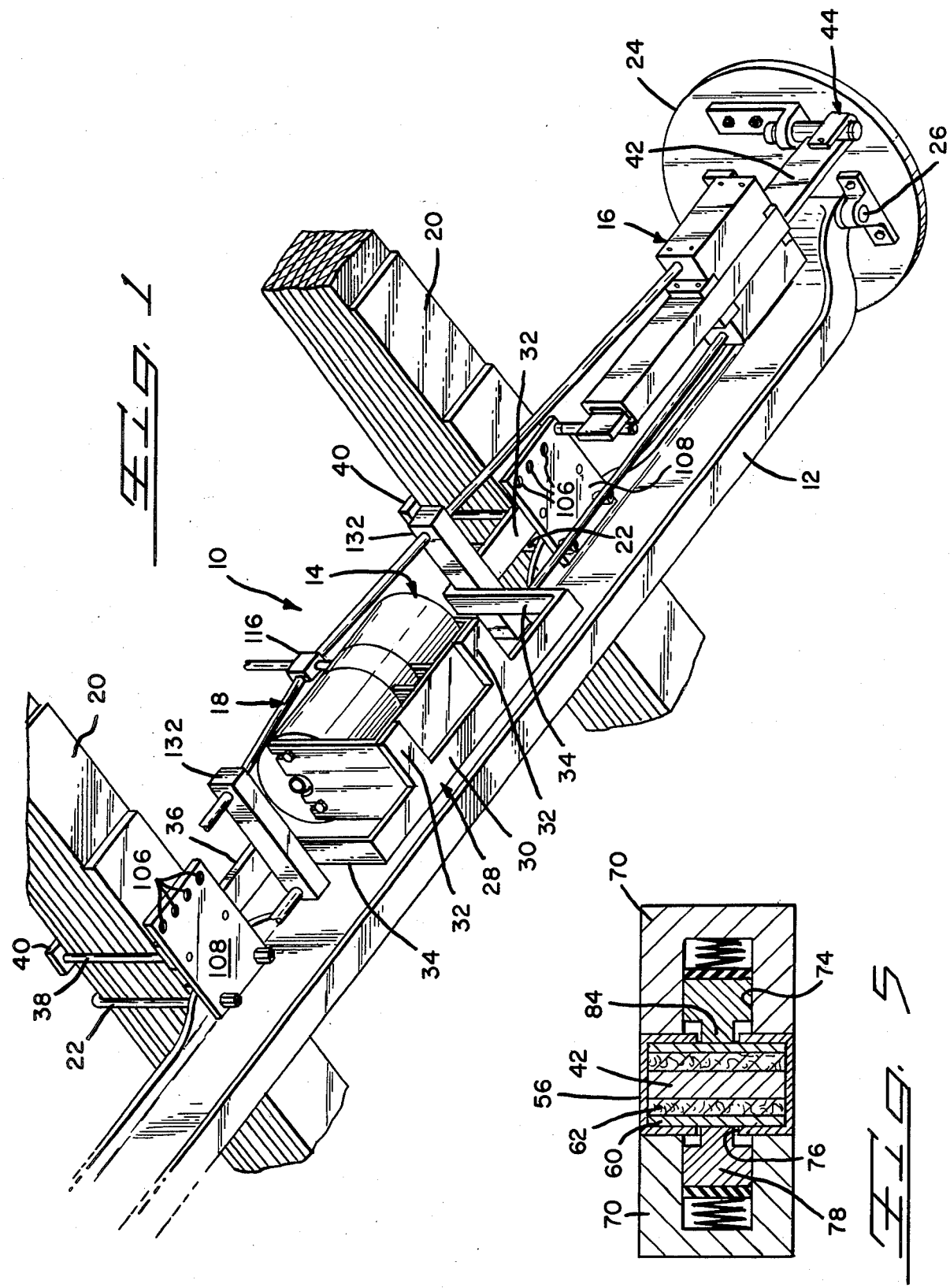

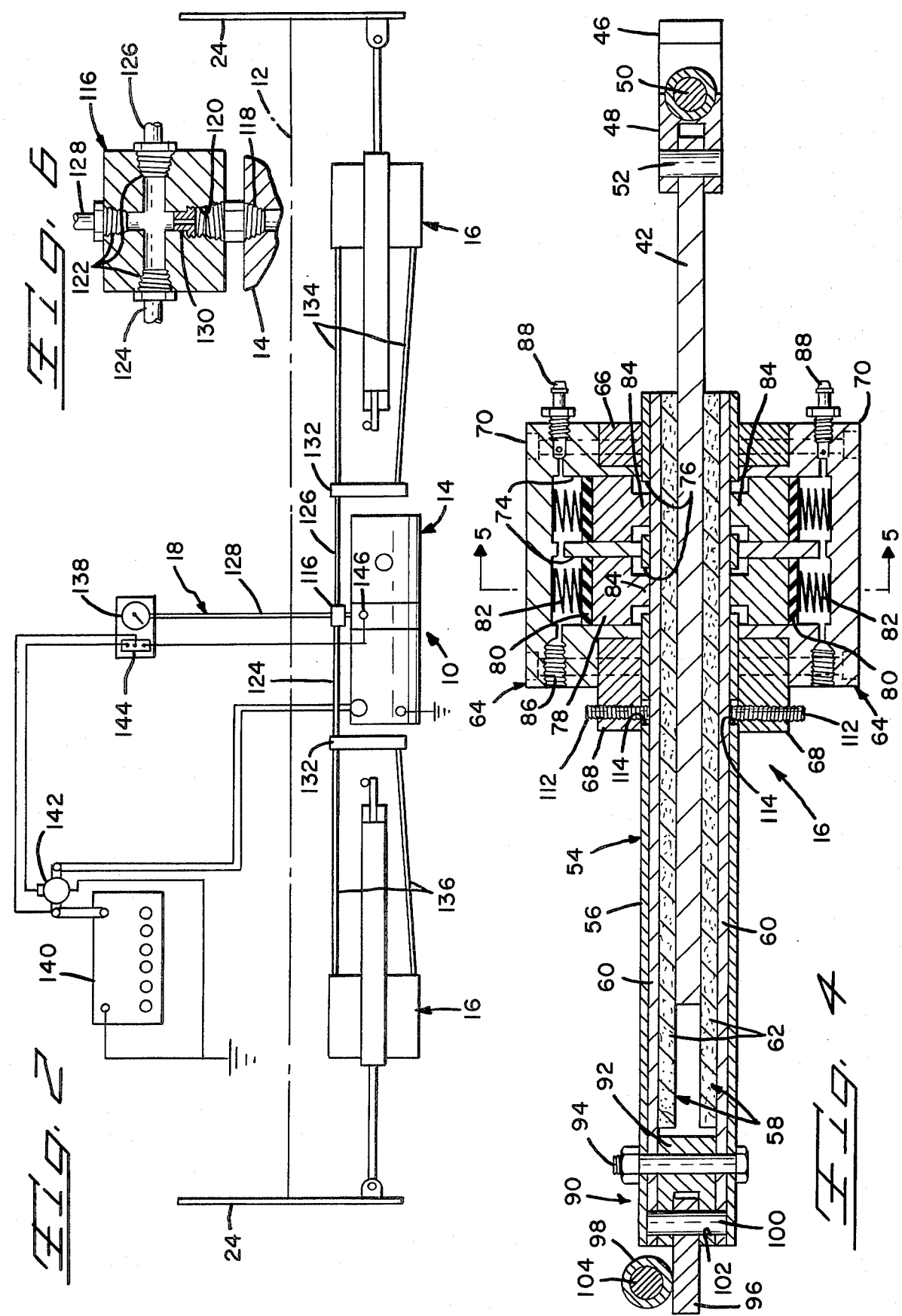

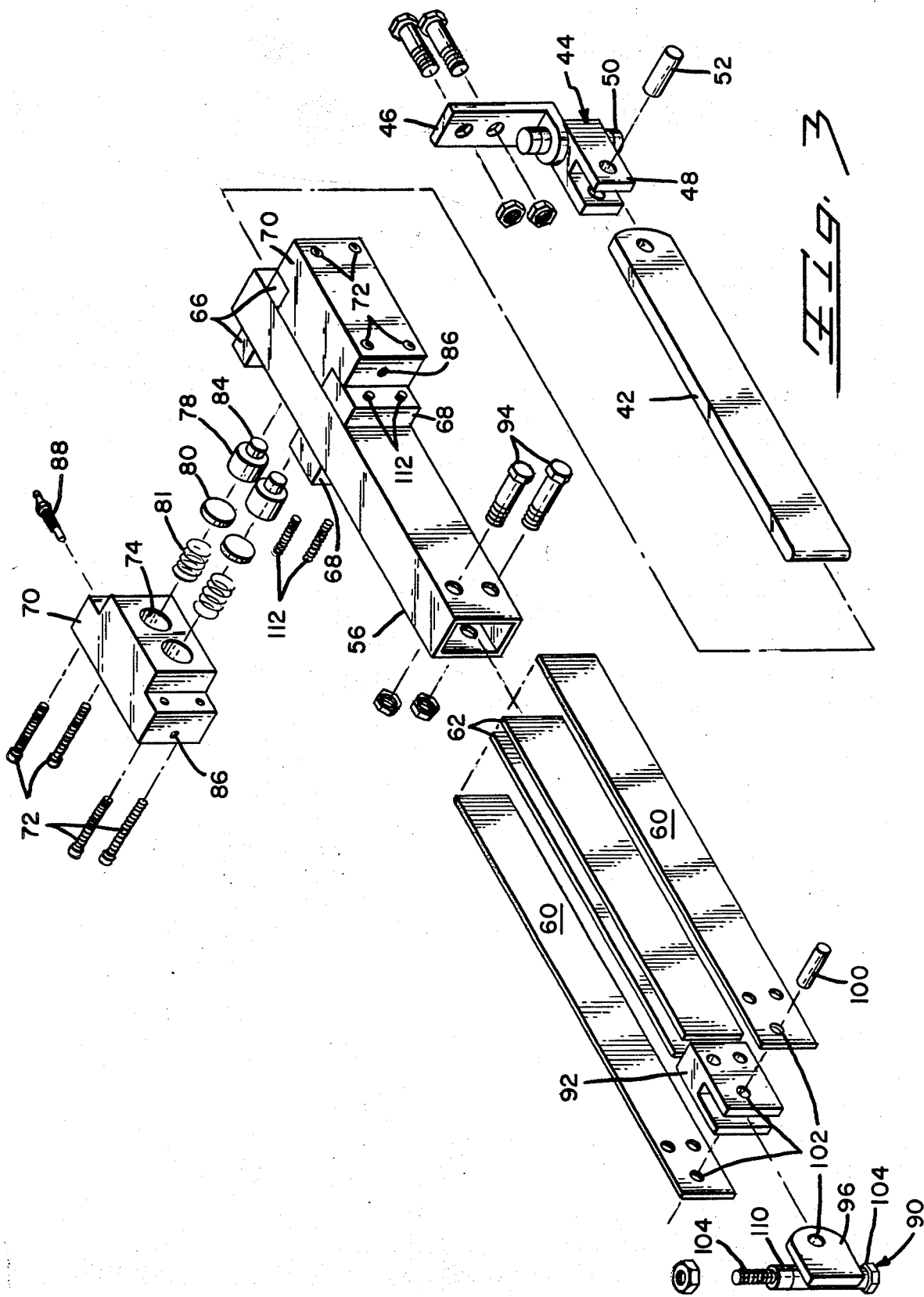

STEERING STABILIZER

This invention relates to an improved steering stabilizer for maintaining the front wheels of a roadway vehicle in the straight-ahead position despite unexpected forces exerted on the vehicle which could otherwise angularly displace or twist the front wheels and cause the vehicle to swerve or turn unexpectedly.

The steering stabilizer is particularly useful on large roadway vehicles such as trucks or mobile homes. These vehicles are susceptible to loadings which tend to twist the front wheels unexpectedly so that the steering wheel is jerked to one side or the other. This type of steering problem may be caused by side winds, drafts caused by being passed by large semi-trailer trucks, roadway conditions such as potholes, bumps and surface irregularity and even by failure of one of the steering tires due to a blowout.

Conventional steering dampers, have been proposed for limiting undesired deflection of the vehicle steering wheels. Spring-type dampers are shown in U.S. Pat. Nos. 3,721,455; 3,980,315 and 4,213,626. A shock absorber-type damper is proposed in U.S. Pat. No. 3,420,542. In practice, these types of dampers have proved to be ineffective in preventing undesired angular displacement of steering wheels. The dampers all have one setting which affects the front wheels whether the vehicle is being driven at highway or low speeds. Further, the dampers are incapable of damping angular displacement of the steering wheels as effectively as the present damper. The springs and shock absorbers have a relatively short useful life in comparison to the long life of the present steering stabilizer.

The disclosed steering stabilizer uses a pair of adjustably operable stabilizing assemblies each mounted between the backing plate of one front wheel and a rigid support on the vehicle. Each assembly includes a stabilizing bar and a hydraulic clamp unit which is connected to a hydraulic pressure unit through a hydraulic control system. The driver may increase the pressure supplied to the clamp assemblies when it is desired that the steering be relatively damped, for instance when the vehicle is being driven at high speeds and is not being steered sharply. The pressure of the fluid supplied to the clamp units may be decreased as desired to reduce the stiffness of the stabilizer assemblies in accordance with the requirements of the driving environment. The driver may increase or decrease the pressure of the hydraulic fluid as required by moving a control switch from a neutral position to one of two alternative operating positions. The control system includes a hydraulic fluid pressure guage which indicates the pressure of the fluid supplied to the clamp units. The guage also serves to enable the driver to set the degree of stiffness of the stabilizing assemblies by use of the two-position switch.

Each stabilizing assembly includes a pair of clamp units which bias opposed flat brake shoes against opposite sides of a flat elongate stabilizing bar. The shoes extend a relatively long distance along the bar to assure relatively uniform frictional forces are exerted on the bar despite the elongation or collapse of the stabilizing assemblies when in use.

Other objects and features of the invention will become apparent as the description proceeds, especially when taken in conjunction with the accompanying drawings illustrating the invention, of which there are three sheets of drawings and one embodiment.

IN THE DRAWINGS

FIG. 1 is a perspective view partially broken away of the bottom of a vehicle front axle showing a steering stabilizer according to the invention;

FIG. 2 is a diagrammatic view of the steering stabilizer illustrating the hydraulic circuitry;

FIG. 3 is partial exploded view of one of the stabilizing assemblies used in the stabilizer;

FIG. 4 is a sectional view taken through the assembly of FIG. 3;

FIG. 5 is a sectional view taken along line 5—5 of FIG. 4; and

FIG. 6 is a sectional view taken through a hydraulic manifold shown in FIG. 2.

DESCRIPTION OF THE INVENTION

As illustrated in FIG. 1, steering stabilizer 10 is mounted next to vehicle front axle 12 and includes a self-contained hydraulic pressure unit 14, a pair of like stabilizing assemblies 16 and a hydraulic control system 18 comprising hydraulic lines, manifolds and controls interconnecting the pressure unit and stabilizing assemblies. The axle 12 is secured to the vehicle front springs 20 by conventional U-bolts 22 fitted around springs and through holes formed through the top of the axle. The vehicle front wheel assemblies (not illustrated) include backing plates 24 which are pivotably mounted on the ends of axle 12 by a vertical pin connection 26 to permit movement of the wheel assemblies about the connection as the vehicle is steered by way of a conventional steering assembly (not illustrated).

A support cradle 28 includes a lower support bar 30 having a pair of arms 32 extending away from the axle, a pair of riser bars 34 and end bars 36 which extend from the riser bars under springs 20. The end bars 36 are mounted to the springs by rods 38 which extend from plates 108 through the bars vertically across the springs and through cross bars 40 at the tops of the springs. With the cradle 28 in position as shown in FIG. 1, the lower bar and arms 30 and 32 are located at a level slightly above the bottom of the axle 12 and the bar and arms support a U-shaped bracket which in turn carries hydraulic pressure unit 14.

Pressure unit 14 is of a commercially available type and includes an electric motor, a hydraulic fluid pump, a hydraulic reservoir, a one-way valve and an electrically operated release for a valve. When the pressure unit is actuated, the motor drives the pump to pressurize the fluid and force it past the one-way valve and into the hydraulic control system 18. The valve maintains pressure in the system after the motor is deactivated. The release deactivates the valve, reducing the pressure and allowing hydraulic fluid to flow back to the reservoir.

Stabilizing assemblies 16 each include a flat stabilizing bar 42 connected at one end to a backing plate 24 by way of a universal pivot connection 44 best shown in FIG. 3. The connection includes an L-shaped mounting bracket 46 which is bolted to the backing plate. Yoke 48 is secured to the bracket by vertical yoke pin 50 to permit pivoting of the yoke about a vertical axis. The adjacent end of bar 42 is held within the yoke by a pin 52 to permit the bar to pivot up and down relative to a backing plate. The end of the bar is curved as shown in FIG. 3 to prevent hitting the yoke during movement about pin 52.

Stabilizing assemblies 16 each include a friction unit 54. Unit 54, as illustrated in FIGS. 3 and 4, includes a hollow rectangular tube 56 with a pair of long flat brake shoes 58 fitted within the tube adjacent opposite vertical sides. Each brake shoe has a metal backing strip 60 with a strip of high-friction braking material 62 secured to the backing strip in a conventional manner. The material 62 may be asbestos material of the type conventionally used for automotive and industrial brakes. Heavy duty grease resistant material is peferred. As shown in FIG. 4, strip 60 runs nearly the full length of the tube 56.

Each friction unit has a pair of hydraulic cylinder or clamp units 64 located on opposite sides of the friction unit and secured to the tube 56 by blocks 66 and 68 fastened on the sides of the tube. The clamp cylinder units include a cylinder block 70 secured to the mounting blocks 66 and 68 by suitable bolts 72. Piston bores 74 extend into block 70 above piston openings 76 formed through the adjacent tube side wall. Pistons 78, piston caps 80 and springs 82 are confined within bores 74. The pistons are provided with reduced diameter plungers 84 which extend through openings 76 to directly engage the brake shoes. The springs are confined between the piston cups and the bottoms of the bores and bias the pistons against the shoes. A hydraulic passage extends through block 70 and communicates fitting end 86, the bottoms of the piston bores and a hydraulic bleed valve 88 located on the opposite side of the block 70 from end 86.

The friction units are provided with a pair of clamp units to assure that equal clamping force is exerted on both sides of the stabilizing bar. In this way, the bar is clamped without being subjected to forces which tend to move the bar laterally and bow the entire stabilizing assembly. Bowing of the assembly could cause the bar to bind within the assembly and make it more difficult to expand or collapse the stabilizing assembly.

The pistons have a larger diameter than openings 76 to prevent the pistons from coming out of the bores 74 whenever the brake shoes are removed from the tube 58. The friction units are self-adjusting in that the pistons directly engage the shoes regardless of the thickness of the lining 62.

The end of the friction unit away from the clamp units is connected to the vehicle chassis by a universal pivot connection 90 similar to universal pivot connection 44. Connection 90 includes a fixed yoke 92 fitted within the end of tube 56 and held in place by a pair of cross bolts 94. Stub bar 96 is secured to vertical sleeve 98 and extends between the fork of the yoke 92. A cross pin 100 holds the stub bar in place in the yoke. The pin extends through holes 102 in the stub bar, yoke and brake shoe backing strips 60 and secures the brakes to the friction unit. The tube 56 overlies holes 102 in the backing strips to confine the pin in place.

Bolt 104 extends through sleeve 98 and one of a number of mounting holes 106 provided along one side of attachment plate 108 secured to the axle and adjacent spring. As shown in FIG. 1, the U-bolt 22 holds plate 108 against the upper flange of the axle. Bolts 38 extend through the cradle end bars 36 and are secured to the attachment plate thereby assuring that the plate is rigidly mounted to the vehicle.

A wear collar 110 is positioned on bolt 104 about sleeve 98. The free end of bolt 104 extends through the appropriate hole 106 and is secured in place, preferably using a shock-proof nut. When the stabilizing assembly is mounted on plate 108, the connection 90 permits rotation of the assembly about bolt 104 and pivoting of the assembly about pin 102, thereby preventing binding. Likewise, connection 44 connecting the stabilizing assembly to the backing plate prevents binding.

Stabilizing bar 42 has a close telescopic sliding fit between the brake shoes in the friction unit. Following insertion of the bar into the unit, adjustment screws 112 threaded into blocks 68 and extending through openings 114 in the tube 56 are tightened down to press the brake shoes against the bar 42. The screws maintain a minimal frictional engagement between the frictional unit and the bar when the hydraulic fluid is not pressurized. The screws are locked in place to maintain this minimum engagement between the friction unit and the stabilizing bar.

The hydraulic control system 18 includes a manifold 116 connected to the hydraulic fluid outlet port 118 of pressure unit 14. The manifold includes an inlet port 120 connected to outlet port 118 and three outlet ports 122 connected, respectively, to hydraulic lines 124, 126 and 128. A metering orifice 130 is positioned within the manifold inlet port 120 to meter the flow of hydraulic fluid from and to the pressure unit and, in that way, prevent very rapid increase and decrease of pressure within the clamp units 64.

As illustrated in FIGS. 1 and 2, hydraulic lines 124 and 126 extend from manifold 116 to side manifolds 132. These manifolds include central passages connecting lines 124 and 126 with flexible branch hydraulic lines 134 and 136 which are connected to fitting ends 86 of blocks 70. In this way, pressurized fluid flowing through manifold 116 is transmitted to each of the pressure chambers of the four hydraulic clamp units 64. Pressure line 128 extends from manifold 116 to a pressure guage 138 preferably mounted on the dashboard where it may be observed by the driver.

The vehicles electrical system includes a battery 140 with one terminal connected to a solenoid 142 such that upon actuation of the solenoid the terminal is connected to the electric motor in the hydraulic pressure unit 14. A two-position control switch 144 is mounted next to the pressure guage 138 and is operable to either connect the battery to the solenoid, thereby actuating the hydraulic pressure unit to pressurize the hydraulic fluid or to connect the battery to a pressure release terminal 146 on the hydraulic pressure unit, thereby opening the one-way valve in the unit and allowing the hydraulic fluid to flow back into the pressure unit 14, with a resultant reduction in pressure. The switch 144 is spring biased to the control "off" position.

Brackets 46 are bolted to their respective wheel assembly backing plates 24 a horizontal distance away from the axis of the connection between the backing plates and axle 12 so that any rotation of the wheel assemblies about such axies extends or collapses the stabilizing assemblies by moving bar 42 back and forth between the brake shoes 58. The force biasing the brake shoes against the bar, whether supplied by adjustment screws 112 or pistons 78, resists this relative movement and tends to hold the wheel assemblies in the normal straight-ahead position.

Operation of Steerinq Stabilizer

While the steering stabilizer may be used on any vehicle to stabilize the front wheels against unexpected angular displacement from the straight-ahead position, it is particularly useful in stabilizing the front wheels of motor homes, and large trucks and other vehicles subject to unexpected angular displacement of the front wheels due to road roughness, potholes, cross winds, and swaying which occurs when the vehicle is passed by other roadway vehicles. The front wheels are also subject to unexpected angular displacement in the event of a blowout. Unexpected angular displacement of the front wheels causes the steering wheel to jerk unexpectedly with the force dependent upon the severity of the angular displacement. The unexpected nature of the steering wheel movement and the unexpected force of the movement make it difficult for the driver to anticipate and compensate for the turning of the steering wheel and keep the vehicle proceeding along the highway in the proper traffic lane.

In operation, the driver controls the amount of dampening provided by stabilizer 10 by means of the two-position spring-return switch 144. The switch includes a control handle which may be moved in one direction to activate solenoid 142 thereby increasing the pressure of the hydraulic fluid. The handle may be moved in the opposite direction to release the control valve thereby reducing the pressure in the fluid. When released, the switch handle returns to the neutral position with the pressure relief switch in unit 14 closed so that the hydraulic fluid pressure is maintained at the level indicated on guage 138. All hydraulic fluid flowing from unit 14 passes through the restriction orifice 130 in manifold 116. This orifice assures that the pressure of the fluid supplied to units 64 and the pressure guage 138 increases or decreases relatively gradually, thus supplying a gradually increased or decreased dampening force on the stabilizing bars 42 and enabling the driver to shift switch 144 when the pressure of the hydraulic fluid is at a desired level as indicated by the pressure guage. In this way, the operator can selectively control the amount of dampening force applied to the stabilizing bars. For instance, when the vehicle is moving slowly and turning, it is necessary for the bars 42 to slide relatively freely within the friction units. The pressure is reduced thereby reducing steering forces and enabling the driver to turn the steering wheel easily to rotate the front wheels as required.

When the vehicle is driven along the road, the wheels need not be turned sharply. The vehicle is steered around most roadway curves by any slight angular displacement of the front wheels. Also, during this type of relatively high-speed driving there is an increased possibility that the vehicle will be subjected to forces tending to rotate the front wheels unexpectedly and severely. As the vehicle speed increases and the necessity for making desired large, angular displacement of the front wheels decreases, the operator increases the pressure of the hydraulic fluid in the control assembly 18 thereby increasing the forces exerted the brake shoes by pistons 84 and, as a result, increases the dampening force exerted on the stabilizing bars 42. This force resists angular displacement of the front wheels in response to unexpected forces exerted on the vehicle. The dampening force exerted on bars 42 may be increased or decreased in accordance with road conditions. Thus, when a vehicle is traveling at a high speed along a straight superhighway the pressure exerted on the brake shoes may be relatively great, thereby resulting in a high dampening force sufficient to maintain the wheels in the straight-ahead position despite potholes, side winds, and similar forces exerted on the vehicle which would otherwise tend to move the vehicle unexpectedly to the right or left. The driver can overcome the dampening forces supplied by stabilizer 10 by turning the steering wheel to assure that proper control is maintained given the driving conditions. When it is necessary to turn sharp corners, switch 144 may be actuated to reduce the force exerted on bars 42, thereby enabling the driver to easily turn the vehicle. If desired, the hydraulic system may include a pressure controller which limits the amount of maximum pressure available, thereby assuring that the stabilizing assemblies do not lock up.

The disclosed steering stabilizer uses stabilizer assemblies where the bars are connected to the vehicle front wheel assemblies and the friction units are connected to supports on the vehicle. Obviously, the bars could be connected to the vehicle supports and the friction units could be connected to the front wheel assemblies, if desired. The resulting steering stabilizer will work in the manner as previously described. Longer hydraulic lines 134 and 136 would have to be provided in order to accommodate the increased movement of the friction assemblies in response to turning of the wheel assemblies. Also, suitable boots and seals may be provided to protect the moving parts of the steering assembly from the effects of dirt, grease, and, in general, the harsh environment encountered during roadway use. Provision may also be made to lubricate the pivot connections 44 and 90.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim our invention is:

1. A steering stabilizer for a roadway vehicle comprising a stabilizer assembly having a stabilizing bar, a first connection adapted to join one end of the bar to either a vehicle front wheel assembly or a fixed support on the vehicle, a friction unit telescopically engageable with the bar, a second connection adapted to join the friction unit to the other of the front wheel assembly or vehicle support, the friction unit including a brake shoe on one side of the bar and a clamp unit operable to bias the bar and shoe together to generate a frictional force opposing relative telescopic movement of the stabilizer assembly, said clamp unit including a hydraulic expansion chamber for biasing the brake shoe against the bar, and a system for actuating the clamp unit including a remote control adapted to be located adjacent the vehicle operator, the system including a source of high-pressure hydraulic fluid, a hydraulic line extending from the source to the expansion chamber and the remote control including an actuator moveable from a neutral position to either a first position for actuating the source to increase the pressure of hydraulic fluid in the expansion chamber and thereby increase the frictional engagement between the brake shoe and the bar or to a second position for reducing the pressure of the hydraulic fluid in the expansion chamber and thereby reducing the frictional engagement between the brake shoe and the bar, whereby the operator may increase or decrease frictional engagement between the shoe and bar in accordance with roadway conditions.

2. A steering stabilizer as in claim 1 wherein the friction unit includes a second clamp unit like the clamp unit recited in claim 1 located on the opposite side of the bar from the first-recited clamp unit, a second brake shoe positioned between the second clamp unit and the bar, said system actuating both of said clamp units and so that the bar is sandwiched between the brake shoes.

3. A steering stabilizer as in claim 2 wherein said actuator is biased toward the neutral position.

4. A steering stabilizer as in claim 2 wherein said clamp units each include a piston bore and a piston in the bore between the expansion chamber and the brake shoe, part of the piston away from the expansion chamber operatively contacting the brake shoe so that pressurization of hydraulic fluid in the chamber biases the piston toward the brake shoe to force the shoe against the bar.

5. A steering stabilizer as in claim 4 wherein the stabilizer assembly includes means in the path of movement of each piston toward the bar for limiting movement of the piston from the bore.

6. A steering stabilizer as in claim 5 wherein said means includes a portion of the stabilizer assembly extending into the piston bore, each piston including a portion extending axially along the bore beyond said portion for engagement with the brake shoe.

7. A steering stabilizer as in claim 4 wherein each clamp unit includes a pair of like pistons engageable with said brake shoes, the pistons in each clamp assembly being spaced along the length of the bar.

8. A steering stabilizer as in claim 4 wherein each clamp unit includes means for preloading the brake shoe into engagement with the bar.

9. A steering stabilizer as in claim 4 including a restriction orifice located within the hydraulic lines between the source of high-pressure hydraulic fluid in the stabilizer assembly.

10. A steering stabilizer as in claim 4 wherein the friction unit includes a tube having opposite side walls, said brake shoes are positioned within the tube against said opposite side walls with the bar positioned within the tube between the brake shoes, said clamp units being located on the exterior of said side walls, piston openings formed through the said side walls in alignment with the clamp member pistons, said pistons extending through the openings to engage the brake shoes.

11. A steering assembly stabilizer as in the 10 wherein said pistons include reduced diameter plungers on the ends thereof adjacent the brake shoes and said piston openings being smaller than the diameter of the piston bores to prevent over-extension of the pistons into the interior of the tube.

12. A steering stabilizer as in claim 10 including adjustable members carried on said side walls of the tube operable to hold the brake shoes against the bar.

13. A steering stabilizer as in claim 10 wherein each of said first and second connections permit universal relative pivot movement of the stabilizer assembly with respect to the front wheel assembly or support to prevent binding.

14. A steering assembly as in claim 10 wherein said tube is rectangular in cross section and the brake shoes and bar extend across the height of said side walls.

* * * * *